US009704480B2

(12) United States Patent
Tateno

(10) Patent No.: US 9,704,480 B2
(45) Date of Patent: Jul. 11, 2017

(54) INFORMATION PROCESSING APPARATUS, METHOD FOR PROCESSING INFORMATION, AND PROGRAM

(71) Applicant: SONY CORPORATION, Tokyo (JP)

(72) Inventor: Kei Tateno, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/529,204

(22) Filed: Oct. 31, 2014

(65) Prior Publication Data

US 2015/0058008 A1 Feb. 26, 2015

Related U.S. Application Data

(63) Continuation of application No. 12/846,975, filed on Jul. 30, 2010, now abandoned.

(30) Foreign Application Priority Data

Aug. 12, 2009 (JP) ................. P2009-187046

(51) Int. Cl.
| | |
|---|---|
| *G06F 17/30* | (2006.01) |
| *G10L 15/18* | (2013.01) |
| *G06Q 30/02* | (2012.01) |
| *G10L 15/01* | (2013.01) |
| *G10L 15/26* | (2006.01) |

(52) U.S. Cl.
CPC .............. *G10L 15/18* (2013.01); *G06Q 30/02* (2013.01); *G10L 15/01* (2013.01); *G10L 15/26* (2013.01)

(58) Field of Classification Search
None
See application file for complete search history.

(56) References Cited

U.S. PATENT DOCUMENTS

| | | |
|---|---|---|
| 2002/0107853 A1 | 8/2002 | Hofmann et al. |
| 2004/0172267 A1 | 9/2004 | Patel et al. |
| 2008/0071602 A1 | 3/2008 | Ojakaar et al. |

(Continued)

OTHER PUBLICATIONS

Mihai Gurban, Jean-Philippe Thiran, Thomas Drugman, and Thierry Dutoit. 2008. Dynamic modality weighting for multi-stream hmms inaudio-visual speech recognition. In Proceedings of the 10th international conference on Multimodal interfaces (ICMI '08). ACM, New York, NY, USA, 237-240. DOI: http://dx.doi.org/10.1145/1452392.1452442.*

(Continued)

*Primary Examiner* — Syed Hasan
(74) *Attorney, Agent, or Firm* — Chip Law Group

(57) ABSTRACT

An information processing apparatus includes a specific-evaluation information acquisition unit that acquires an evaluation of a predetermined content item as a specific evaluation, the evaluation having been input by a user in accordance with an ordinal scale; a language-evaluation information extraction unit that acquires a language evaluation from language information regarding an evaluation sentence in which an evaluation of the predetermined content item is expressed in a language, the evaluation sentence having been input by the user; and a recommendation unit that recommends a content item that matches the user's preference in accordance with whether the specific evaluation is a positive or negative evaluation and whether the language evaluation is a positive or negative evaluation.

10 Claims, 10 Drawing Sheets

(56) References Cited

U.S. PATENT DOCUMENTS

2009/0157652 A1* 6/2009 Barbosa ............ G06F 17/30864
2009/0265332 A1   10/2009 Mushtaq et al.
2010/0083320 A1*  4/2010 Roberts .............. H04N 7/17318
                                                              725/61

OTHER PUBLICATIONS

Binali, H., "A State of the Art Opinion Mining and s Application Domains". IEEE International Conference. Feb. 2009, pp. 1-6.
Downie, J. Stephen., "Review Mining for Music Dig tal Libraries: Phase II", Conference 6—Jun. 2006, pp. 196-197; 536-539.
European Search Report issued Dec. 9, 201 ( , in Hague, in corresponding EP 10 17 1279.
Hu, X., "Mining Music Review: Promising Prelimina ~Results". Sep. 2005, pp. 536-539.
Kobayashi, N., "Opinion Mining from Wed Documents: Extraction and Structurization", vol. 22, No. 2, Feb. 2007, pp. 227-238.
Kobayashi, N., Opinion Mining as Extraction of Att ibute-Value Relations•. Lecture Notes in Artificial Intelligence. Jan. 2006, pp. 470-481.

* cited by examiner

FIG. 2

|  | FEATURE VALUE | | | FINAL EVALUATION VALUE |
| --- | --- | --- | --- | --- |
|  | SPEED | CHEERFULNESS | SOUND DENSITY | |
| TUNE A | 35 | 50 | 84 | 2.0 |
| TUNE B | 70 | 58 | 37 | 3.5 |
| TUNE C | 88 | 80 | 20 | 5.5 |
| TUNE D | 50 | 60 | 65 | 1.5 |
| TUNE E | 60 | 75 | 55 | 4.0 |
| TUNE F | 66 | 55 | 40 | UNVALUED |
| TUNE G | 38 | 20 | 63 | UNVALUED |
| TUNE H | 25 | 37 | 42 | UNVALUED |
| TUNE I | 73 | 59 | 76 | UNVALUED |

FIG. 6

| EVALUATION ATTRIBUTE | FEATURE VALUE |
|---|---|
| "TEMPO" | SPEED |
| "SPEEDY" | SPEED |
| "SPEED" | SPEED |
| ... | ... |
| "CHEERFUL" | CHEERFULNESS |
| "FESTIVE" | CHEERFULNESS |
| ... | ... |
| "VERY DEEP" | SOUND DENSITY |
| ... | ... |

FIG. 7

WHICH ASPECT OF TUNE A DO YOU LIKE?

☐ SPEED
☐ CHEERFULNESS
☐ SOUND DENSITY
☐ ALL
☐ OTHERS

OK

INFORMATION PROCESSING APPARATUS, METHOD FOR PROCESSING INFORMATION, AND PROGRAM

CROSS REFERENCES TO RELATED APPLICATIONS

This application is a continuation of U.S. patent application Ser. No. 12/846,975 filed Jul. 30, 2010, which claims priority to Japan P2009-187046, filed on Aug. 12, 2009. The disclosure of the above-referenced applications is expressly incorporated herein by reference in its entirety.

BACKGROUND OF THE INVENTION

1. Field of the Invention

The present invention relates to an information processing apparatus, a method for processing information, and a program. More specifically, the present invention relates to an information processing apparatus, a method for processing information, and a program that make it possible to recommend content items that match preference of a user with higher accuracy.

2. Description of the Related Art

Typical methods for evaluating content items include a method using a two-class ordinal scale such as "like" and "dislike" and a method using a five-class ordinal scale such as a five star system.

However, these evaluation methods do not make it possible to recognize which aspect of a content item the user gives a positive evaluation to. Moreover, the evaluation methods do not make it possible to recognize evaluations given to aspects of the content item. An example of the evaluations is "I like this aspect of the content item but I do not like that aspect of the content item".

On the other hand, a technology for analyzing content of a sentence written in a natural language has been recently designed (for example, see N. Kobayashi, "Opinion Mining from Web Documents: Extraction and Structurization", Transaction of The Japanese Society for Artificial Intelligence, vol. 22, no. 2, 2007, pp. 227 to 238). Thus, if this technology is used, an evaluation of a content item can be recognized from a sentence input by the user.

For example, it can be recognized from the sentence "I like the melody of tune A" input by the user that the user gives a high evaluation "like" to the aspect "melody" of a content item "tune A".

SUMMARY OF THE INVENTION

However, such a technology has not been fully developed. Moreover, sentences written in a natural language may have ambiguity unique to the language and certain information unique to the language may be omitted from those sentences. Thus, such a technology may often have a problem regarding accuracy. Therefore, it may be unlikely that content items that match the user's preference with high accuracy can be recommended by simply using an evaluation recognized by this technology as the user's preference.

It is desirable to make it possible to recommend content items that match the user's preference with higher accuracy.

An information processing apparatus according to an embodiment of the present invention is an information processing apparatus that includes specific-evaluation information acquisition means for acquiring an evaluation of a predetermined content item as a specific evaluation, the evaluation having been input by a user in accordance with an ordinal scale; language-evaluation information extraction means for acquiring a language evaluation from language information regarding an evaluation sentence in which an evaluation of the predetermined content item is expressed in a language, the evaluation sentence having been input by the user; and recommendation means for recommending a content item that matches the user's preference in accordance with whether the specific evaluation is a positive or negative evaluation and whether the language evaluation is a positive or negative evaluation.

A method for processing information and a program according to an embodiment of the present invention correspond to an information processing apparatus according to an embodiment of the present invention.

According to an embodiment of the present invention, an evaluation of a predetermined content item is acquired as a specific evaluation, the evaluation having been input by a user in accordance with an ordinal scale; a language evaluation is acquired from language information regarding an evaluation sentence in which an evaluation of the predetermined content item is expressed in a language, the evaluation sentence having been input by the user; and a content item that matches the user's preference is recommended in accordance with whether the specific evaluation is a positive or negative evaluation and whether the language evaluation is a positive or negative evaluation.

As described above, according to the embodiments of the present invention, content items that match the user's preference with higher accuracy can be recommended.

BRIEF DESCRIPTION OF THE DRAWINGS

FIG. 2 is a diagram showing an example of feature values of content items and final evaluation values of the content items;

FIG. 6 is a diagram of an example of attribute-and-feature-value correspondence information;

FIG. 7 is a diagram of an example of an input screen;

DESCRIPTION OF THE PREFERRED EMBODIMENTS

First Embodiment

Figure 1:
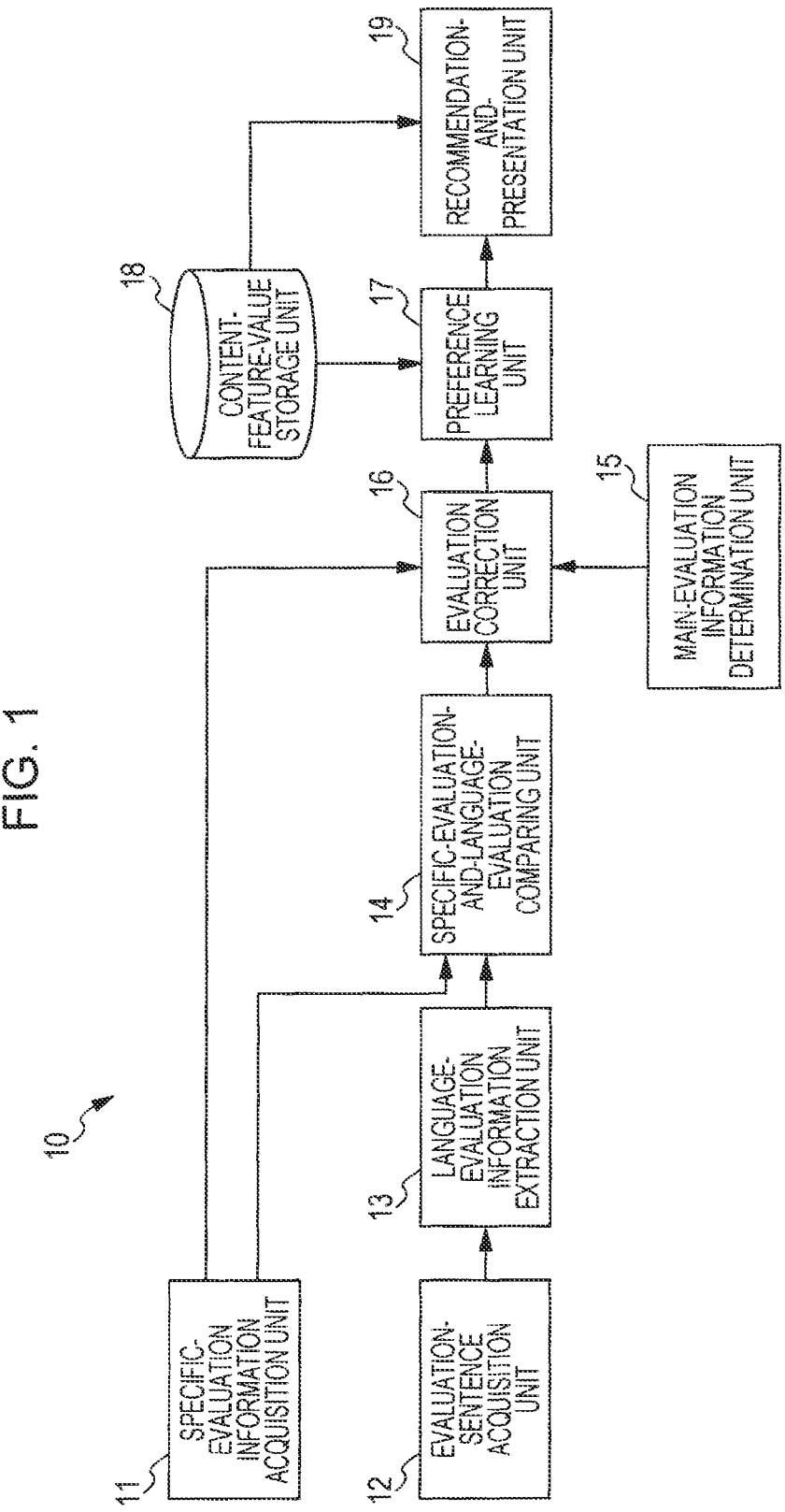
FIG. 1 is a block diagram of an exemplary structure of an information processing apparatus according to a first embodiment of the present invention.

FIG. 1 is a block diagram of an exemplary structure of an information processing apparatus according to a first embodiment of the present invention.

An information processing apparatus 10 shown in FIG. 1 includes a specific-evaluation information acquisition unit 11, an evaluation-sentence acquisition unit 12, a language-evaluation information extraction unit 13, a specific-evaluation-and-language-evaluation comparing unit 14, a main-evaluation information determination unit 15, an evaluation correction unit 16, a preference learning unit 17, a content-feature-value storage unit 18, and a recommendation-and-presentation unit 19.

The specific-evaluation information acquisition unit 11 receives an evaluation of a content item, the evaluation having been input by a user in accordance with a five-class ordinal scale such as the five-star system. More specifically, the specific-evaluation information acquisition unit 11 receives an evaluation value input, by the user, which is an evaluation value of "1" representing an evaluation of "one star", an evaluation value of "2" representing an evaluation of "two stars", an evaluation value of "3" representing an evaluation of "three stars", an evaluation value of "4" representing an evaluation of "four stars", or an evaluation value of "5" representing an evaluation of "five stars". Here, a higher number of stars indicates a higher evaluation.

Such an evaluation value is input, by the user by operating a keyboard or a mouse (both of them not shown). Evaluation values may be normalized in such a manner that the average of the evaluation values is 0 and the variance of the evaluation values is 1.

Moreover, the specific-evaluation information acquisition unit 11 treats the evaluation value, which has been input and received, as an evaluation value of a specific evaluation. The specific-evaluation information acquisition unit 11 determines whether the specific evaluation input by the user is a positive or negative evaluation in accordance with the evaluation value of the specific evaluation.

For example, when the evaluation value is greater than three, the specific-evaluation information acquisition unit 11 determines that the specific evaluation is a positive evaluation. When the evaluation value is less than or equal to three, the specific-evaluation information acquisition unit 11 determines that the specific evaluation is a negative evaluation. The specific-evaluation information acquisition unit 11 supplies the determination result as the specific evaluation to the specific-evaluation-and-language-evaluation comparing unit 14.

The evaluation-sentence acquisition unit 12 acquires language information regarding an evaluation sentence, in which an evaluation of a content item is expressed in a language, the evaluation sentence having been input by the user by using a microphone or a keyboard (both of them not shown). More specifically, the evaluation-sentence acquisition unit 12 acquires the language information by converting speech of the evaluation sentence acquired from the microphone by using a predetermined speech recognition technology. Moreover, the evaluation-sentence acquisition unit 12 acquires language information regarding an evaluation sentence described in a blog managed by the user, a blog managed by a person specified by the user, or the like. The evaluation-sentence acquisition unit 12 supplies the language information regarding the acquired evaluation sentences to the language-evaluation information extraction unit 13.

The language-evaluation information extraction unit 13 extracts evaluation information, which is information regarding an evaluation, from the language information regarding the evaluation sentences supplied from the evaluation-sentence acquisition unit 12. For example, the language-evaluation information extraction unit 13 extracts, as evaluation information, the name of the content item "tune A" and an evaluation "like" from the language information regarding the evaluation sentence "I like the melody of tune A very much".

Moreover, the language-evaluation information extraction unit 13 determines whether an evaluation of the evaluation sentences is a positive or negative evaluation in accordance with extracted evaluation information, and supplies the determination result as a language evaluation to the specific-evaluation-and-language-evaluation comparing unit 14.

Here, the language-evaluation information extraction unit 13 performs processing on the premise that the evaluation sentence is related to a content item that is currently being played or whose content is currently being viewed (hereinafter referred to as a subject content item). Note that when the content item to be evaluated can be specified by the evaluation sentence, whether the content item matches the subject content item may be checked. In this case, when the content item specified by the evaluation sentence is different from the subject content item, downstream processing is prevented from being performed.

Moreover, when the evaluation sentences supplied from the evaluation-sentence acquisition unit 12 do not include any words representing a positive evaluation or any words representing a negative evaluation, the language-evaluation information extraction unit 13 determines that the language evaluation is neither a positive nor negative evaluation. The language-evaluation information extraction unit 13 supplies nothing to the specific-evaluation-and-language-evaluation comparing unit 14, and downstream processing is not performed.

The specific-evaluation-and-language-evaluation comparing unit 14 recognizes a relationship between the specific evaluation supplied from the specific-evaluation information acquisition unit 11 and the language evaluation supplied from the language-evaluation information extraction unit 13. For example, when both the specific evaluation and the language evaluation are positive evaluations, the specific-evaluation-and-language-evaluation comparing unit 14 recognizes that the specific evaluation matches the language evaluation, as the relationship between the specific evaluation and the language evaluation. On the other hand, when the specific evaluation is a negative evaluation and the language evaluation is a positive evaluation or when the specific evaluation is a positive evaluation and the language evaluation is a negative evaluation, the specific-evaluation-and-language-evaluation comparing unit 14 recognizes that the specific evaluation does not match the language evaluation, as the relationship between the specific evaluation and the language evaluation. The specific-evaluation-and-language-evaluation comparing unit 14 supplies the relationship between the specific evaluation and the language evaluation to the evaluation correction unit 16.

The main-evaluation information determination unit 15 determines that one of the specific evaluation and the language evaluation is to be a main evaluation, which is assumed to reflect the user's true evaluation. In the first embodiment, the specific evaluation is predetermined to be the main evaluation. The main-evaluation information determination unit 15 specifies the specific evaluation as the main evaluation in the evaluation correction unit 16.

The evaluation correction unit 16 corrects the evaluation value of the specific evaluation supplied from the specific-evaluation information acquisition unit 11, in accordance with the relationship between the specific evaluation and the language evaluation supplied from the specific-evaluation-and-language-evaluation comparing unit 14. The evaluation correction unit 16 supplies the corrected evaluation value of the specific evaluation as a final evaluation value to the preference learning unit 17.

The preference learning unit 17 performs preference learning by using the final evaluation value supplied from the evaluation correction unit 16 and a feature value of the subject content item stored in the content-feature-value storage unit 18.

As a first method of the preference learning, there is a method for learning, as preference information, a relational expression expressing the relationship between a feature value and the final evaluation value by performing linear regression in which the feature value of a content item is treated as an independent variable and the final evaluation value is treated as a dependent variable. Here, when the content item is a tune, feature values of the content item include musical or vocal features, or property values such as a genre, keywords, and a mood.

Moreover, as a second method of the preference learning, there is a method for learning, as preference information, an average vector of a content group corresponding to the final evaluation value representing a positive evaluation (hereinafter the average vector being referred to as a preference vector), feature values of each of the content items being represented as a vector in the second method. This second method is specifically described in Japanese Unexamined Patent Application Publication No. 2001-160955.

Here, when the preference learning unit 17 performs preference learning by using the second method, the preference learning unit 17 may create, as negative preference information, an average vector of a content group corresponding to the final evaluation value representing a negative evaluation (hereinafter the average vector being referred to as a negative preference vector), similarly to the final evaluation value representing a positive evaluation.

The preference learning unit 17 supplies the created preference information to the recommendation-and-presentation unit 19. The content-feature-value storage unit 18 stores feature values of content items.

When the recommendation-and-presentation unit 19 receives the relational expression as the preference information from the preference learning unit 17, the recommendation-and-presentation unit 19 calculates, for each of the content items that the user has not yet evaluated (hereinafter referred to as unvalued content items), a predicted evaluation value of the unvalued content item in accordance with the relational expression and the feature values of the content items stored in the content-feature-value storage unit 18. Moreover, when the recommendation-and-presentation unit 19 receives the preference vector as the preference information from the preference learning unit 17, the recommendation-and-presentation unit 19 calculates the degree of similarity or the distance between the preference vector and the vector representing feature values of the unvalued content item.

Then, the recommendation-and-presentation unit 19 treats, for each of the unvalued content items, the name of the unvalued content item and the like as an information item regarding the content item (hereinafter referred to as a content-related information item), and makes a display unit (not shown) display, as content-related information items regarding recommended content items, content-related information items regarding the unvalued content items in descending order of the predicted evaluation value or the degree of similarity or in ascending order of the distance. That is, the recommendation-and-presentation unit. 19 recommends content items that match the user's preference and makes the content-related information items regarding the content items be displayed.

Here, in the information processing apparatus 10, the main evaluation does not have to be predetermined, but may be determined in accordance with the magnitude of a prediction error resulting from the preference learning performed by the preference learning unit 17.

In this case, the specific-evaluation information acquisition unit 11 supplies an evaluation value whose input has been accepted also to the main-evaluation information determination unit 15. Moreover, when the evaluation of the evaluation sentences is a positive evaluation, the language-evaluation information extraction unit 13 supplies an evaluation value between four and five or equal to four or five to the main-evaluation information determination unit 15. In contrast, when the evaluation of the evaluation sentences is a negative evaluation, the language-evaluation information extraction unit 13 supplies an evaluation value between one and three or equal to one or three to the main-evaluation information determination unit 15.

Here, when the language-evaluation information extraction unit 13 can recognize the level of language evaluation (hereinafter referred to as a language evaluation level) from the evaluation sentences supplied from the evaluation-sentence acquisition unit 12, the language-evaluation information extraction unit 13 holds the language evaluation 1 and sets the evaluation value to a value within the above-described range in accordance with the language evaluation level. For example, the language-evaluation information extraction unit 13 recognizes that the language evaluation level of the evaluation sentence "I like the melody of tune A very much" is high from "very much" in the evaluation sentence. For example, in a case in which the language evaluation level is a value in the range from 0 to 1, the language-evaluation information extraction unit 13 sets the language evaluation value to 0.8 and the evaluation value to 4.8 (=4+0.8×(5−4)).

Furthermore, the preference learning unit 17 performs not only preference learning by using the specific evaluation but also preference learning by using the language evaluation, and calculates a predicted value of the evaluation value of the specific evaluation and a predicted value of the evaluation value of the language evaluation regarding the subject content item.

The main-evaluation information determination unit 15 calculates a prediction error in accordance with the predicted value of the evaluation value of the specific evaluation of the subject content item supplied from the preference learning unit 17 and the evaluation value supplied from the specific-evaluation information acquisition unit 11. Moreover, the main-evaluation information determination unit 15 calculates a prediction error in accordance with the predicted value of the evaluation value of the language evaluation of the subject content item supplied from the preference learning unit 17 and the evaluation value supplied from the language-evaluation information extraction unit 13. Then, the main-evaluation information determination unit 15 determines that the main evaluation is to be one of the specific evaluation and language evaluation that has a smaller prediction error.

The ordinal scale accepted by the specific-evaluation information acquisition unit 11 may have any number of classes. For example, when the ordinal scale has two classes such as "like" and "dislike", the specific-evaluation information acquisition unit 11 receives an evaluation value of "1" representing an evaluation "like" input by the user or an evaluation value of "−1" representing an evaluation of "dislike" input by the user. When the evaluation value is "1", the specific-evaluation information acquisition unit 11 determines that the specific evaluation is a positive evaluation. When the evaluation value is "−1", the specific-evaluation information acquisition unit 11 determines that the specific evaluation is a negative evaluation.

Here, the following will describe a case in which the preference learning unit 17 performs preference learning by using the second method and the recommendation-and-presentation unit 19 calculates the degree of similarity regarding the unvalued content items in accordance with the preference information.

FIG. 2 is a diagram showing an example of feature values of content items and final evaluation values of the content items.

As shown in FIG. 2, when the content items are tunes, the content-feature-value storage unit 18 stores, for example, the speed, the cheerfulness, and the sound density as feature values of the content items.

In the example shown in FIG. 2, the speed of tune A is 35, the cheerfulness of tune A is 50, and the sound density of tune A is 84. The speed of tune B is 70, the cheerfulness of tune B is 58, and the sound density of tune B is 37. The speed of tune C is 88, the cheerfulness of tune C is 80, and the sound density of tune C is 20. The speed of tune D is 50, the cheerfulness of tune D is 60, and the sound density of tune D is 65.

The speed of tune E is 60, the cheerfulness of tune E is 75, and the sound density of tune E is 55. The speed of tune F is 66, the cheerfulness of tune F is 55, and the sound density of tune F is 40. The speed of tune G is 38, the cheerfulness of tune G is 20, and the sound density of tune G is 63. The speed of tune H is 25, the cheerfulness of tune H is 37, and the sound density of tune H is 42. The speed of tune I is 73, the cheerfulness of tune I is 59, and the sound density of tune I is 76.

Tunes A, B, C, D, and E have already been evaluated by the user. The final evaluation value of tune A is 2.0, that of tune B is 3.5, that of tune C is 5.5, that of tune D is 1.5, and that of tune E is 4.0.

In this case, for example, when the preference learning unit 17 determines that final evaluation values greater than three are positive final evaluation values, an average vector (72.7, 71, 37.3) of tunes B, C, and E is a preference vector.

The recommendation-and-presentation unit 19 calculates the reciprocal, which is 0.057, of the Euclidean distance between the vector representing feature values of tune F, which is unvalued, and the preference vector; the reciprocal, which is 0.014, of the Euclidean distance between the vector representing feature values of tune G, which is unvalued, and the preference vector; the reciprocal, which is 0.017, of the Euclidean distance between the vector representing feature values of tune H, which is unvalued, and the preference vector; and the reciprocal, which is 0.025, of the Euclidean distance between the vector representing feature values of tune I, which is unvalued, and the preference vector. The recommendation-and-presentation unit 19 sets the degree of similarity regarding tune F to 0.057, the degree of similarity regarding tune G to 0.014, the degree of similarity regarding tune H to 0.017, and the degree of similarity regarding tune I to 0.025. As a result, content-related information items regarding tunes F to I are presented to the user in descending order of the degree of similarity, that is, in order of tune F, tune I, tune H, and tune G.

Here, when the preference learning unit 17 creates negative preference information, the recommendation-and-presentation unit 19 may be allowed not to present content-related information items regarding tunes whose Euclidean distance to the negative preference information is short, from among the unvalued tunes F to I.

Figure 3:
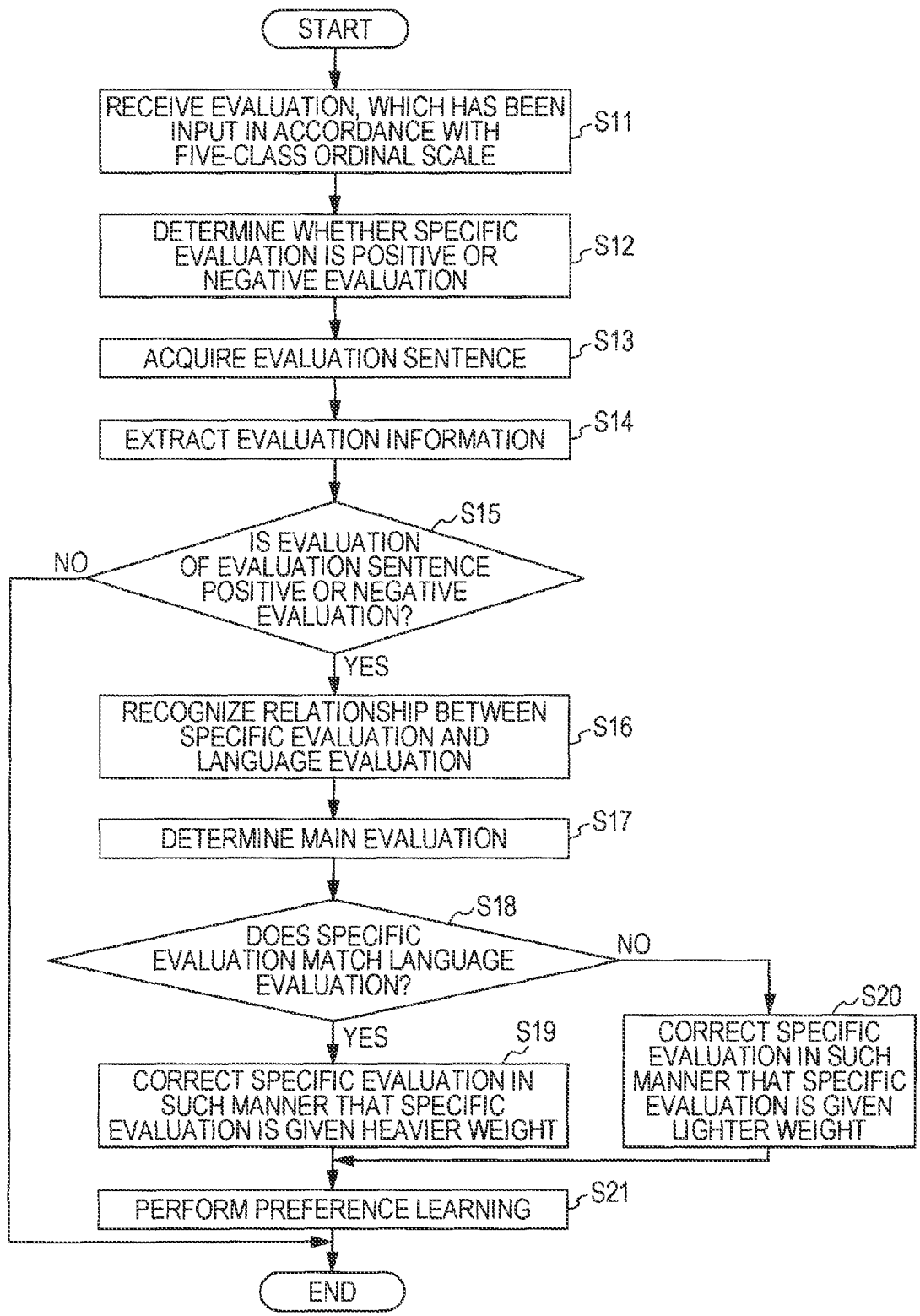
FIG. 3 is a flowchart illustrating learning processing performed by the information processing apparatus shown in FIG. 1.

FIG. 3 is a flowchart illustrating learning processing performed by the information processing apparatus 10 shown in FIG. 1. This learning processing starts when, for example, the user inputs a class of a five-class ordinal scale and an evaluation sentence regarding a subject content item.

In step S11, the specific-evaluation information acquisition unit 11 receives an evaluation, which is a class of the five-class ordinal scale input by the user. In step S12, the specific-evaluation information acquisition unit 11 treats the evaluation value received in step S11 as the evaluation value of a specific evaluation, and determines whether the specific evaluation input by the user is a positive or negative evaluation in accordance with the evaluation value of the specific evaluation. Then, the specific-evaluation information acquisition unit 11 supplies the determination result as the specific evaluation to the specific-evaluation-and-language-evaluation comparing unit 14.

In step S13, the evaluation-sentence acquisition unit 12 acquires language information regarding the evaluation sentence input by the user. In step S14, the language-evaluation information extraction unit 13 extracts evaluation information from the language information regarding the evaluation sentence supplied from the evaluation-sentence acquisition unit 12.

In step S15, the language-evaluation information extraction unit 13 determines whether the evaluation of the evaluation sentence is a positive or negative evaluation in accordance with the evaluation information extracted in step S14.

If the language-evaluation information extraction unit 13 determines that the evaluation of the evaluation sentence is neither a positive nor negative evaluation in step S15, the procedure ends.

In contrast, if the language-evaluation information extraction unit 13 determines that the evaluation of the evaluation sentence is a positive or negative evaluation in step S15, the language-evaluation information extraction unit 13 supplies a determination result indicating that the evaluation of the evaluation sentence is a positive or negative evaluation, as a language evaluation, to the specific-evaluation-and-language-evaluation comparing unit 14.

In step S16, the specific-evaluation-and-language-evaluation comparing unit 14 recognizes a relationship between the specific evaluation supplied from the specific-evaluation information acquisition unit 11 and the language evaluation supplied from the language-evaluation information extraction unit 13. The specific-evaluation-and-language-evaluation comparing unit 14 supplies the relationship between the specific evaluation and the language evaluation to the evaluation correction unit 16.

In step S17, the main-evaluation information determination unit 15 determines that the main evaluation is to be the specific evaluation, and specifies the specific evaluation as the main evaluation in the evaluation correction unit 16. In step S18, the evaluation correction unit 16 determines whether the specific evaluation matches the language evaluation in accordance with the relationship between the specific evaluation and the language evaluation supplied from the specific-evaluation-and-language-evaluation comparing unit 14.

In step S18, if the evaluation correction unit 16 determines that the specific evaluation matches the language evaluation, that is, both the specific evaluation and the language evaluation are positive evaluations or both of them are negative evaluations, the procedure proceeds to step S19.

In step S19, the evaluation correction unit 16 corrects the evaluation value of the specific evaluation supplied from the specific-evaluation information acquisition unit 11 in such a manner that the specific evaluation, which is the main evaluation, is given a heavier weight.

More specifically, for example, when both the specific evaluation and the language evaluation are positive evaluations, it is assumed that there is a high probability that the user gives a positive evaluation to the subject content item. As a result, the evaluation correction unit 16 changes, for example, the evaluation value, which is 4, of the specific evaluation supplied from the specific-evaluation information acquisition unit 11 to 4.5 by adding 0.5 to the evaluation value.

Here, the evaluation correction unit 16 may change the evaluation value of the specific evaluation to a constant multiple thereof. Moreover, when the language-evaluation information extraction unit 13 recognizes the language evaluation level, the evaluation correction unit 16 may set the magnitude of correction in accordance with a degree corresponding to the language evaluation level. In this case, for example, when the evaluation sentence includes "very much", the evaluation correction unit 16 sets the magnitude of correction to 0.8, which is larger than an addition value of 0.5 used when the evaluation sentence does not include "very much".

Then, the evaluation correction unit 16 supplies the corrected evaluation value as the final evaluation value to the preference learning unit 17. Then, the procedure proceeds to step S21.

In contrast, if the evaluation correction unit 16 determines that the specific evaluation does not match the language evaluation in step S18, that is, one of the specific evaluation and the language evaluation is a positive evaluation and the other is a negative evaluation, the procedure proceeds to step S20.

In step S20, the evaluation correction unit 16 corrects the specific evaluation in such a manner that the specific evaluation, which is the main evaluation, is given a lighter weight, that is, the specific evaluation is made to be closer to a middle evaluation.

More specifically, for example, when the specific evaluation is a negative evaluation and the language evaluation is a positive evaluation, it is assumed that although the user gives a rather low evaluation to the subject content item in terms of the specific evaluation, there is an aspect the user gives a high evaluation to. Thus, for example, the evaluation correction unit 16 changes the evaluation value, which is 2, of the specific evaluation supplied from the specific-evaluation information acquisition unit 11 to 2.5, which is closer to the middle value, which is 3, of an evaluation value range by 0.5.

Here, the evaluation correction unit 16 may change the evaluation value of the specific evaluation to a value which is closer to the middle value by a constant multiple of the difference between the evaluation value of the specific evaluation and the middle value of the evaluation value range. In this case, the evaluation value of the specific evaluation after correction is a value obtained by adding the middle value to a constant multiple of the value that is obtained by subtracting the middle value from the evaluation value of the specific evaluation before the correction. For example, when the evaluation value of the specific evaluation before correction is 2 and a constant is 0.5, the evaluation value of the specific evaluation after the correction is 2.5 (=3+(2−3)×0.5). The constant used here may be preset, or may be set in accordance with the degree corresponding to the language evaluation level. When the constant is set in accordance with the language evaluation level, the specific evaluation is given a lighter weight in accordance with a degree corresponding to the language evaluation level.

The evaluation correction unit 16 supplies the corrected evaluation value as the final evaluation value to the preference learning unit 17. Then, the procedure proceeds to step S21.

In step S21, the preference learning unit 17 performs preference learning by using the final evaluation values of evaluated content items including the final evaluation value of the subject content item supplied from the evaluation correction unit 16 and the feature values of evaluated content items including the subject content item stored in the content-feature-value storage unit 18. Then, the procedure ends.

Figure 4:
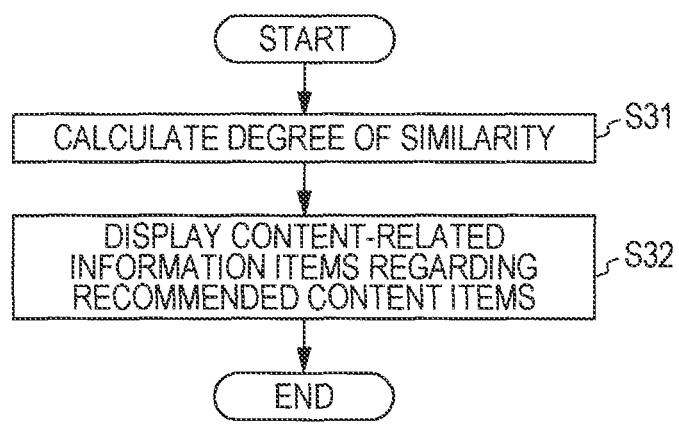
FIG. 4 is a flowchart, illustrating recommended-content presentation processing performed by the information processing apparatus shown in FIG. 1.

FIG. 4 is a flowchart illustrating recommended-content presentation processing performed by the information processing apparatus 10. This recommended-content presentation processing starts when, for example, the user commands presentation of recommended content items.

In step S31, for each of unvalued content items stored in the content-feature-value storage unit 18, the recommendation-and-presentation unit 19 calculates the degree of similarity between the preference vector created by the preference learning unit 17 and the vector representing feature values of the unvalued content item.

In step S32, the recommendation-and-presentation unit 19 makes a display unit, which is not shown, display content-related information items regarding the unvalued content items, as content-related information items regarding recommended content items, in descending order of the degree of similarity. Then, the procedure ends.

As described above, the information processing apparatus 10 recommends and presents content items in accordance with the relationship between the specific evaluation and the language evaluation. Thus, the information processing apparatus 10 can recommend and present content items that match the user's preference with higher accuracy than a case in which content items are recommended in accordance with one of the specific evaluation and the language evaluation.

Second Embodiment

Figure 5:
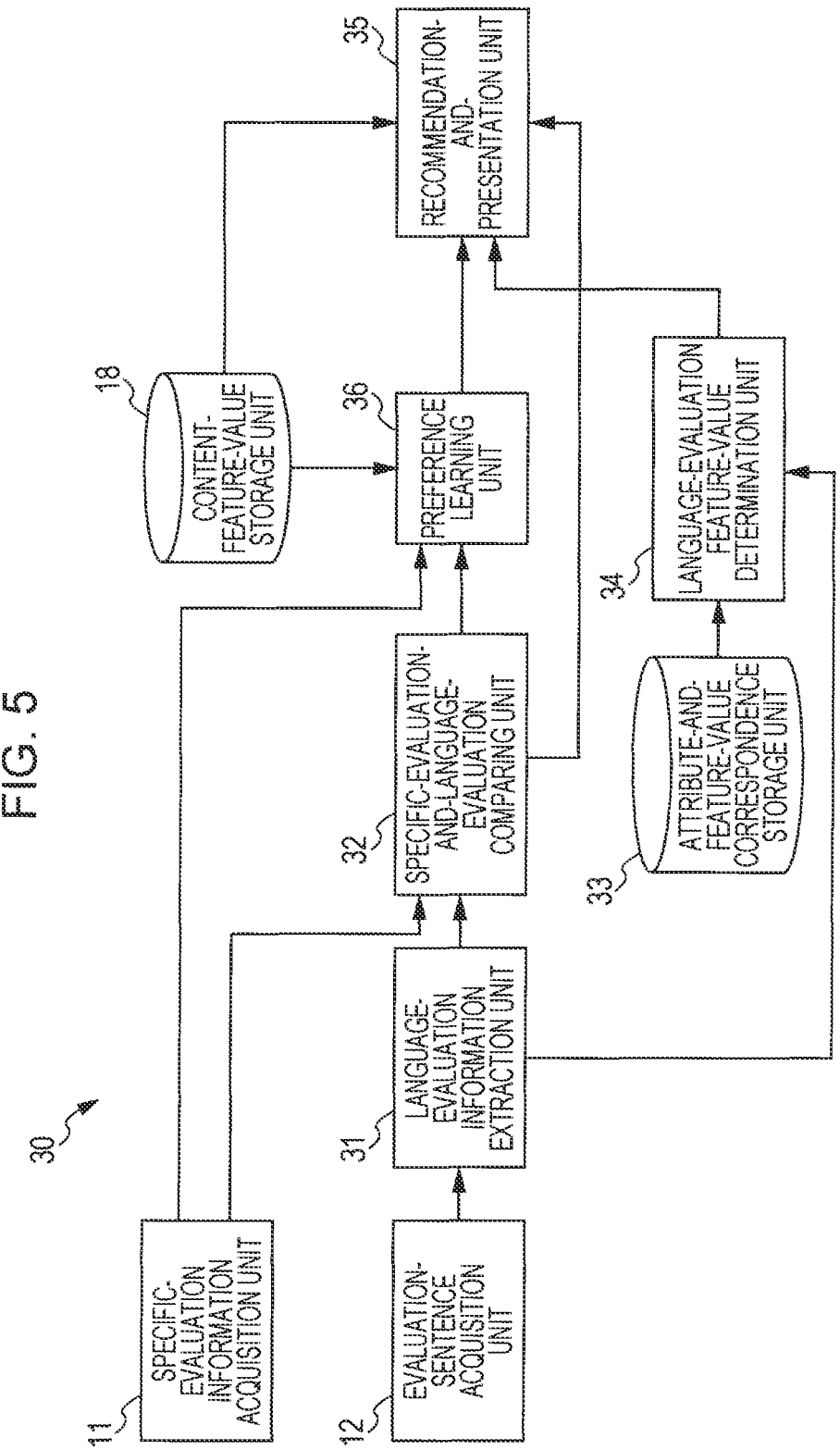
FIG. 5 is a block diagram of an exemplary structure of an information processing apparatus according to a second embodiment of the present invention.

FIG. 5 is a block diagram of an exemplary structure of an information processing apparatus according to a second embodiment of the present invention.

In the structure shown in FIG. 5, components the same as those indicated in the structure shown in FIG. 1 will be denoted by the same reference numerals. Redundant explanation will be omitted as necessary.

The structure of an information processing apparatus 30 shown in FIG. 5 and the structure shown in FIG. 1 differ in that the information processing apparatus 30 includes a language-evaluation information extraction unit 31, a specific-evaluation-and-language-evaluation comparing unit 32, a preference learning unit 36, and a recommendation-and-presentation unit 35 instead of the language-evaluation information extraction unit 13, the specific-evaluation-and-language-evaluation comparing unit 14, the preference learning unit 17, and the recommendation-and-presentation unit 19. The structure of the information processing apparatus 30 shown in FIG. 5 and the structure shown in FIG. 1 also differ in that the information processing apparatus 30 does not include the main-evaluation information determination unit 15 or the evaluation correction unit 16, but includes an attribute-and-feature-value correspondence storage unit 33 and a language-evaluation feature-value determination unit 34.

The information processing apparatus 30 determines a feature value preferred by the user from among feature values of a subject content item in accordance with a specific evaluation, a language evaluation, and feature values of content items corresponding to evaluation attributes of the language evaluation. Then, the information processing apparatus 30 presents content-related information items regarding content items whose feature value is similar to the determined feature value, as content-related information items regarding similar content items, to the user.

Here, an evaluation attribute represents an aspect of a content item, and is a word that is appropriate for representing a feature value of the content item. For example, when the subject content item is a tune, evaluation attributes are the melody, the vocal quality, the rhythm, and the like. When the subject content item is a movie, evaluation attributes are the story, the atmosphere, the background music (BGM), and the like.

The language-evaluation information extraction unit 31 of the information processing apparatus 30 extracts evaluation information including an evaluation attribute from the language information regarding the evaluation sentence supplied from the evaluation-sentence acquisition unit 12, and holds the evaluation information. For example, the language-evaluation information extraction unit 31 extracts, as the evaluation information, the name of the content item "tune A", an evaluation "like", and an evaluation attribute of "melody" from the language information regarding the evaluation sentence "I like the melody of tune A very much".

Here, when any evaluation attributes are not extracted from the evaluation sentence, for example, when the evaluation sentence is "I like tune A" and no evaluation attribute is included, the language-evaluation information extraction unit 31 makes the display unit, not shown, display an input screen (which will be described with reference to FIG. 7) that allows the user to input a feature value. Then, the language-evaluation information extraction unit 31 acquires a feature value from the information input by the user through the input screen, and holds the feature value. This feature value is supplied as a language feature value to the recommendation-and-presentation unit 35 via the language-evaluation feature-value determination unit 34.

Moreover, similarly to the language-evaluation information extraction unit 13 shown in FIG. 1, the language-evaluation information extraction unit 31 determines whether the evaluation of the evaluation sentence is a positive or negative evaluation in accordance with the extracted evaluation information. The language-evaluation information extraction unit 31 supplies the determination result as the language evaluation to the specific-evaluation-and-language-evaluation comparing unit 32.

Furthermore, similarly to the language-evaluation information extraction unit 13, when the evaluation sentence supplied from the evaluation-sentence acquisition unit 12 is neither a positive nor negative evaluation, the language-evaluation information extraction unit 31 supplies nothing to the specific-evaluation-and-language-evaluation comparing unit 32 and downstream processing is not performed.

Similarly to the specific-evaluation-and-language-evaluation comparing unit 14 shown in FIG. 1, the specific-evaluation-and-language-evaluation comparing unit 32 recognizes a relationship between the specific evaluation supplied from the specific-evaluation information acquisition unit 11 and the language evaluation supplied from the language-evaluation information extraction unit 31. The specific-evaluation-and-language-evaluation comparing unit 32 supplies the relationship between the specific evaluation and the language evaluation to the preference learning unit 36. Moreover, the specific-evaluation-and-language-evaluation comparing unit 32 supplies the specific evaluation and the language evaluation to the recommendation-and-presentation unit 35.

The attribute-and-feature-value correspondence storage unit 33 stores, as information regarding the correspondences between attributes and feature values (hereinafter referred to as attribute-and-feature-value correspondence information), a table in which predetermined evaluation attributes are related to feature values of content items.

The language-evaluation feature-value determination unit 34 determines that a language-evaluation feature value is to be a feature value corresponding to an evaluation attribute, which is a word similar to the evaluation attribute extracted by the language-evaluation information extraction unit 31, from among the evaluation attributes included in the attribute-and-feature-value correspondence information stored in the attribute-and-feature-value correspondence storage unit 33. Here, the determination regarding similarity is performed by utilizing a thesaurus or the like. Moreover, the language-evaluation feature-value determination unit 34 supplies the language-evaluation feature value to the recommendation-and-presentation unit 35.

The recommendation-and-presentation unit 35 makes the display unit, not shown, display content-related information items regarding similar content items or recommended content items.

More specifically, the recommendation-and-presentation unit 35 determines one or more feature values (hereinafter referred to as a subject feature value or subject feature values) that are to be used to calculate, for each of recommendation-candidate content items, the degree of similarity or the distance between the subject content item and the recommendation-candidate content item, in accordance with the specific evaluation and language evaluation supplied from the specific-evaluation-and-language-evaluation comparing unit 32 and the language-evaluation feature value supplied from the language-evaluation feature-value determination unit 34. The recommendation-and-presentation unit 35 calculates the degree of similarity or the distance between the subject content item and the recommendation-candidate content item in accordance with the subject feature value or values of the subject content item and the subject feature value or values of the recommendation-candidate content item stored in the content-feature-value storage unit 18. The recommendation-and-presentation unit 35 makes the display unit, not shown, display content-related information items regarding the recommendation-candidate content items as content-related information items regarding similar content items in descending order of the degree of similarity or ascending order of the distance. That is, content items that match the user's preference are recommended to the user as similar content items.

Here, when the recommendation-and-presentation unit 35 makes the content-related information items regarding the similar content items be displayed, the recommendation-and-presentation unit 35 may also make a feature value other than the subject feature value or values be displayed in addition to the content-related information items. In this case, for example, when the name of the subject content item is "tune I" and the feature value other than the subject feature value or values is "sound density", a message such as "Content item that is similar to tune I in terms of feature values other than the sound density is XX" is displayed. Here, "XX" is the name of a similar content item.

Moreover, similarly to the recommendation-and-presentation unit 19 shown in FIG. 1, the recommendation-and-presentation unit 35 calculates, for each of unvalued content items, the degree of similarity between the preference vector supplied as preference information from the preference learning unit 36 and the vector representing feature values of the unvalued content item. Then, the recommendation-and-presentation unit 35 makes the display unit, not shown, display content-related information items regarding the unvalued content items as content-related information items regarding recommended content items in descending order of the degree of similarity. Thus, the content-related information items regarding content items that match the user's preference are presented to the user as content-related information items regarding the recommended content items.

The preference learning unit 36 performs processing similar to that performed by the main-evaluation information determination unit 15, the evaluation correction unit 16, and the preference learning unit 17 shown in FIG. 1.

Here, the information processing apparatus 30 does not have to include the preference learning unit 36. In this case, the recommendation-and-presentation unit 35 has just a function for displaying content-related information items regarding similar content items.

The following will describe a case in which the recommendation-and-presentation unit 35 calculates the degree of similarity.

FIG. 6 is a diagram of an example of attribute-and-feature-value correspondence information.

As shown in FIG. 6, the attribute-and-feature-value correspondence information has a table format in which evaluation attributes are related to feature values.

In the attribute-and-feature-value correspondence information shown in FIG. 6, evaluation attributes such as "tempo", "speedy", and "speed" are related to a feature value "speed". Moreover, evaluation attributes such as "cheerful" and "festive" are related to a feature value "cheerfulness". Furthermore, an evaluation feature such as "very deep" is related to a feature value "sound density".

In this case, for example, when the language-evaluation information extraction unit 31 extracts the evaluation attribute "tempo", the language-evaluation feature-value determination unit 34 determines that the language-evaluation feature value is to be the feature value "speed", to which the evaluation attribute "tempo" is related in the attribute-and-feature-value correspondence information.

FIG. 7 is a diagram of an example of an input screen.

On the input screen shown in FIG. 7, the message "which aspect of tune A do you like?", a list of feature values, and an OK button are displayed. Moreover, for each of the feature values in the list, a check box is displayed to the left of the feature value. When a feature value is selected, a checkmark is placed in the corresponding check box.

As the list of feature values displayed on the input screen, feature values corresponding to the type of subject content item (for example, a tune, a video, and the like) are displayed from among the feature values registered in the attribute-and-feature-value correspondence storage unit 33. Moreover, "all" representing all the displayed feature values and "others" representing feature values that have not been registered in the attribute-and-feature-value correspondence storage unit 33 are also displayed.

In the example shown in FIG. 7, the attribute-and-feature-value correspondence information shown in FIG. 6 is stored in the attribute-and-feature-value correspondence storage unit 33. In the list of feature values, the feature values "speed", "cheerfulness", and "sound density" as well as "all" and "others" are displayed.

When the input screen as shown in FIG. 7 is displayed, the user operates a keyboard or a mouse, not shown, and places a checkmark in a check box corresponding to a feature value, which is an aspect of tune A that the user likes, from among the feature values "speed", "cheerfulness", "sound density", "all", and "others" displayed in the list of feature values. Here, tune A is the subject content item. Then, the user operates the ON button. As a result, the language-evaluation information extraction unit 31 acquires the feature value. Here, the user may place a checkmark in a plurality of check boxes.

Moreover, when any evaluation attributes are not extracted from the evaluation sentence, a text area that allows the user to arbitrarily input evaluation attributes may be displayed instead of the input screen shown in FIG. 7. In this case, the language-evaluation information extraction unit 31 acquires an evaluation attribute input in the text area by the user and supplies the evaluation attribute to the language-evaluation feature-value determination unit 34. The language-evaluation feature-value determination unit 34 treats the evaluation attribute in a similar way in which the language-evaluation feature-value determination unit 34 treats evaluation attributes extracted from the evaluation sentence.

Figure 8:
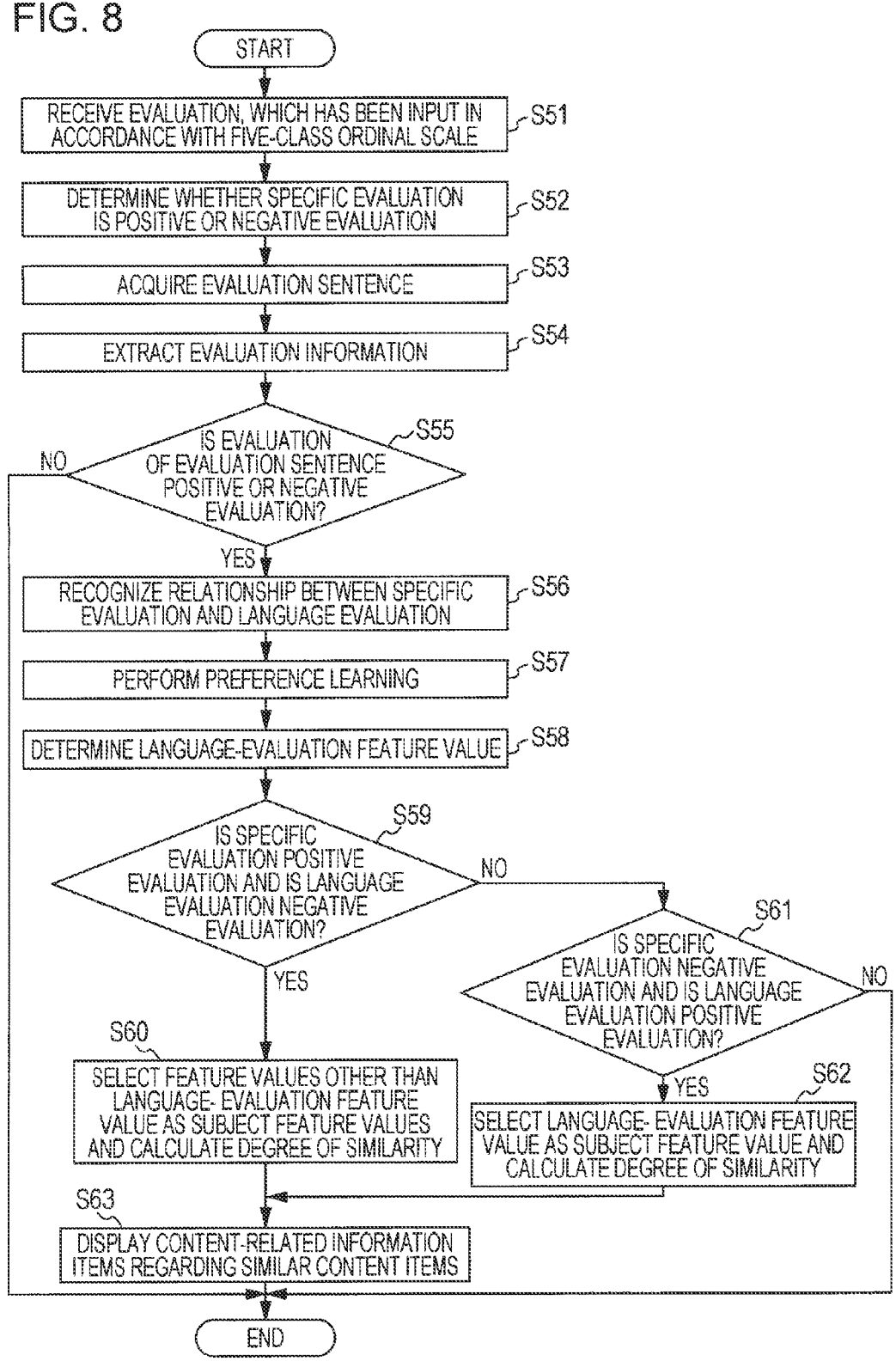
FIG. 8 is a flowchart illustrating similar-content presentation processing performed by the information processing apparatus shown in FIG. 5.

FIG. 8 is a flowchart illustrating similar-content presentation processing performed by the information processing apparatus 30 shown in FIG. 5. This similar-content presentation processing starts when, for example, presentation of similar content items is instructed.

Processing in steps S51 to S53 is similar to processing in steps S11 to S13 shown in FIG. 3. Thus, the description thereof is omitted.

In step S54, the language-evaluation information extraction unit 31 extracts evaluation information including an evaluation attribute from the language information regarding the evaluation sentence supplied from the evaluation-sentence acquisition unit 12.

In step S55, the language-evaluation information extraction unit 31 determines whether the evaluation of the evaluation sentence is a positive or negative evaluation in accordance with the evaluation information extracted in step S54.

If the language-evaluation information extraction unit 31 determines that the evaluation of the evaluation sentence is neither a positive nor negative evaluation in step S55, the procedure ends.

In contrast, if the language-evaluation information extraction unit 31 determines that the evaluation of the evaluation sentence is a positive or negative evaluation in step S55, the language-evaluation information extraction unit 31 supplies, as a language evaluation, a determination result indicating that the evaluation of the evaluation sentence is a positive or negative evaluation to the specific-evaluation-and-language-evaluation comparing unit 32.

In step S56, the specific-evaluation-and-language-evaluation comparing unit 32 recognizes the relationship between the specific evaluation supplied from the specific-evaluation information acquisition unit 11 and the language evaluation supplied from the language-evaluation information extraction unit 31. Then, the specific-evaluation-and-language-evaluation comparing unit 32 supplies the relationship between the specific evaluation and the language evaluation to the preference learning unit 36. Moreover, the specific-evaluation-and-language-evaluation comparing unit 32 supplies the specific evaluation and the language evaluation to the recommendation-and-presentation unit 35.

In step S57, the preference learning unit 36 performs preference learning by performing processing similar to processing in steps S17 to S21 shown in FIG. 3.

In step S58, the language-evaluation feature-value determination unit 34 determines that the language-evaluation feature value is to be a feature value corresponding to an evaluation attribute, which is a word similar to the evaluation attribute extracted by the language-evaluation information extraction unit 31, from among the evaluation attributes in the attribute-and-feature-value correspondence information stored in the attribute-and-feature-value correspondence storage unit 33. Then, the language-evaluation feature-value determination unit 34 supplies the language-evaluation feature value to the recommendation-and-presentation unit 35.

In step S59, the recommendation-and-presentation unit 35 determines whether the specific evaluation is a positive evaluation and the language evaluation is a negative evaluation in accordance with the specific evaluation and language evaluation supplied from the specific-evaluation-and-language-evaluation comparing unit 32.

If the recommendation-and-presentation unit 35 determines that the specific evaluation is a positive evaluation and the language evaluation is a negative evaluation in step S59, the procedure proceeds to step S60.

In step S60, the recommendation-and-presentation unit 35 selects feature values other than the language-evaluation feature value as the subject feature values and calculates, for each of recommendation-candidate content items, the degree of similarity between the subject content item and the recommendation-candidate content item.

More specifically, when the specific evaluation is a positive evaluation and the language evaluation is a negative evaluation, it is assumed that the user has a positive impression of the subject content item in terms of feature values other than the language-evaluation feature value. Thus, the recommendation-and-presentation unit 35 determines that the subject feature values are to be the feature values other than the language-evaluation feature value and calculates, for each of the recommendation-candidate content items, the degree of similarity between the subject content item and the recommendation-candidate content item.

For example, when the subject content item is tune I shown in FIG. 2 and the language-evaluation feature value is "sound density", the recommendation-and-presentation unit 35 calculates, as the degree of similarity, the reciprocal of the Euclidean distance between the vector representing feature values of tune I other than the sound density of tune I and the vector representing feature values of tune F other than the sound density of tune F, the reciprocal of the Euclidean distance between the vector representing the feature values of tune I other than the sound density of tune I and the vector representing feature values of tune G other than the sound density of tune G, and the reciprocal of the Euclidean distance between the vector representing the feature values of tune I other than the sound density of tune I and the vector representing feature values of tune H other than the sound density of tune H, tunes F to H serving as recommendation-candidate content items. As a result, the degree of similarity regarding tune F is 0.12, the degree of similarity regarding tune G is 0.017, and the degree of similarity regarding tune H is 0.019.

Here, instead of not utilizing the language-evaluation feature value to calculate the degree of similarity, the recommendation-and-presentation unit 35 may correct the language-evaluation feature value of the subject content item and utilize the corrected evaluation feature value to calculate the degree of similarity.

In this case, for example, when the average value of the sound densities of all the content items is 50, the recommendation-and-presentation unit 35 corrects the sound density, which is 76, of tune I to 24, which is a value symmetric to the original value of the sound density with respect to the average value. Then, for each of the recommendation-candidate content items, the recommendation-and-presentation unit 35 calculates, as the degree of similarity, the reciprocal of the Euclidean distance between the vector (73, 59, 24) representing the feature values of tune I after correction and the vector representing the feature values of the recommendation-candidate content item.

Here, the recommendation-and-presentation unit 35 may correct the language-evaluation feature value by using the preference vector. In this case, for example, when the preference vector is (72.7, 71, 37.3), the recommendation-and-presentation unit 35 corrects the sound density of tune I to the sound density, which is 37.3, represented by the preference vector. Then, for each of the recommendation-candidate content items, the recommendation-and-presentation unit 35 calculates, as the degree of similarity, the reciprocal of the Euclidean distance between the vector (73, 59, 37.3) representing the feature values of tune I after correction and the vector representing the feature values of the recommendation-candidate content item.

In contrast, if the recommendation-and-presentation unit 35 determines that the specific evaluation is not a positive evaluation or the language evaluation is not a negative evaluation in step S59, the procedure proceeds to step S61.

In step S61, the recommendation-and-presentation unit 35 determines whether the specific evaluation is a negative evaluation and the language evaluation is a positive evaluation in accordance with the specific evaluation and language evaluation supplied from the specific-evaluation-and-language-evaluation comparing unit 32.

If the recommendation-and-presentation unit 35 determines that the specific evaluation is a negative evaluation and the language evaluation is a positive evaluation in step S61, the procedure proceeds to step S62. In step S62, the recommendation-and-presentation unit 35 selects the language-evaluation feature value as the subject feature value, and calculates, for each of the recommendation-candidate content items, the degree of similarity between the subject content item and the recommendation-candidate content item.

More specifically, when the specific evaluation is a negative evaluation and the language evaluation is a positive evaluation, it is assumed that the user has a positive impression of the subject content item only in terms of the language-evaluation feature value. Thus, the recommendation-and-presentation unit 35 determines only the language-evaluation feature value to be the subject feature value and calculates, for each of the recommendation-candidate content items, the degree of similarity between the subject content item and the recommendation-candidate content item.

For example, when the subject content item is tune G shown in FIG. 2 and the language-evaluation feature value is "sound density", the recommendation-and-presentation unit 35 calculates, as the degree of similarity, the reciprocal of the Euclidean distance between the vector representing the sound density of tune G and the vector representing the sound density of tune F, the reciprocal of the Euclidean distance between the vector representing the sound density of tune G and the vector representing the sound density of tune H, and the reciprocal of the Euclidean distance between the vector representing the sound density of tune G and the vector representing the sound density of tune I, tunes F, H, and I serving as recommendation-candidate content items. As a result, the degree of similarity regarding tune F is 0.043, the degree of similarity regarding tune H is 0.048, and the degree of similarity regarding tune I is 0.077.

Here, instead of utilizing only the language-evaluation feature value to calculate the degree of similarity, the recommendation-and-presentation unit 35 may correct feature values of the subject content item other than the language-evaluation feature value of the subject content item and utilize the corrected feature values to calculate the degree of similarity, similarly to the case in which the specific evaluation is a positive evaluation and the language evaluation is a negative evaluation.

After processing in step S60 or S62 is performed, in step S63, the recommendation-and-presentation unit 35 makes content-related information items regarding the recommendation-candidate content items be displayed as content-related information items regarding similar content items in descending order of the degree of similarity calculated in step S60 or S62. Then, the procedure ends.

Moreover, if the recommendation-and-presentation unit 35 determines that the specific evaluation is not a negative evaluation or the language evaluation is not a positive evaluation in step S61, that is, when both the specific evaluation and the language evaluation are positive evaluations or both of them are negative evaluations, the procedure ends.

Here, when an evaluation value input by the user is greater than three, the specific-evaluation information acquisition unit 11 may determine that the specific evaluation is a positive evaluation. When the evaluation value input by the user is three, the specific-evaluation information acquisition unit 11 may determine that the specific evaluation is neither a positive nor negative evaluation. When the evaluation value input by the user is less than three, the specific-evaluation information acquisition unit 11 may determine that the specific evaluation is a negative evaluation. In this case, when the specific evaluation is neither a positive nor negative evaluation, processing similar to that performed when the specific evaluation is a positive evaluation is performed. That is, when the language evaluation is a negative evaluation, the degree of similarity is calculated by using feature values other than the language-evaluation feature value as the subject feature values, and when the language evaluation is neither a positive nor negative evaluation, the degree of similarity is not calculated.

As described above, the information processing apparatus 30 determines the subject feature value in accordance with the language-evaluation feature value, the specific evaluation, and the language evaluation, and recommends recommendation-candidate content items as similar content items in accordance with the degree of similarity regarding the subject feature value or values between the subject content item and each of the recommendation-candidate content items. Thus, the information processing apparatus 30 can recommend content items that match the user's preference with higher accuracy than a case in which content items are recommended in accordance with one of the specific evaluation and the language evaluation.

Third Embodiment

Figure 9:
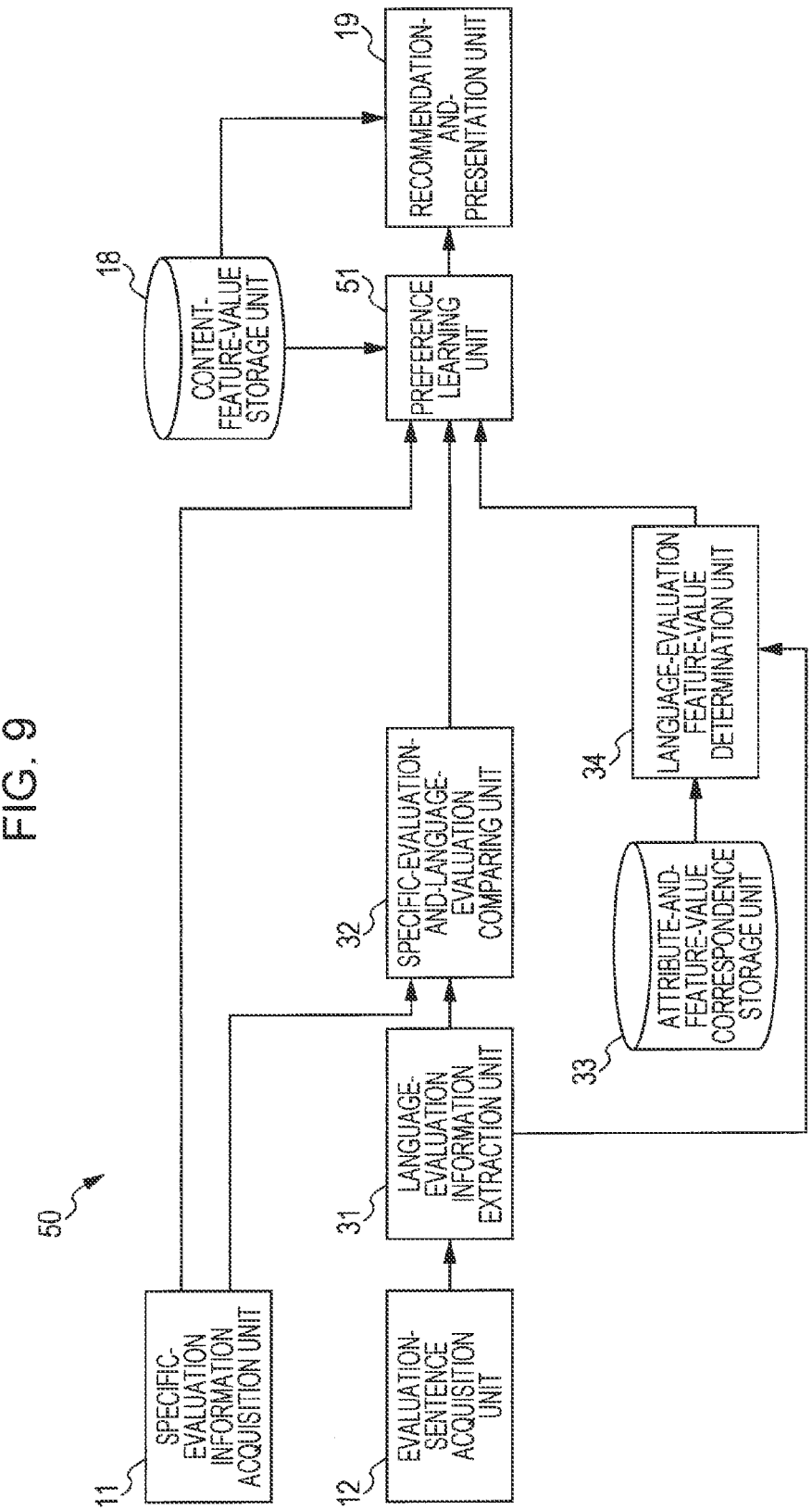
FIG. 9 is a block diagram of an exemplary structure of an information processing apparatus according to a third embodiment of the present invention.

FIG. 9 is a block diagram of an exemplary structure of an information processing apparatus according to a third embodiment of the present invention.

In the structure shown in FIG. 9, components the same as those indicated in the structure shown in FIG. 1 or 5 will be denoted by the same reference numerals. Redundant explanation will be omitted as necessary.

The structure of an information processing apparatus 50 shown in FIG. 9 and the structure shown in FIG. 5 differ in that the information processing apparatus 50 includes the recommendation-and-presentation unit 19 and a preference learning unit 51 instead of the recommendation-and-presentation unit 35 and the preference learning unit 36.

The information processing apparatus 50 determines a learning method in accordance with a specific evaluation, a language evaluation, and feature values of content items corresponding to evaluation attributes of the language evaluation, and performs preference learning by the learning method. Then, the information processing apparatus 50 presents recommended content items to the user in accordance with preference information created by the preference learning.

More specifically, similarly to the main-evaluation information determination unit 15 shown in FIG. 1, the preference learning unit 51 determines that the main evaluation is to be the specific evaluation from among the specific evaluation and the language evaluation. Moreover, similarly to the evaluation correction unit 16 shown in FIG. 1, the preference learning unit 51 corrects the evaluation value of the specific evaluation supplied from the specific-evaluation information acquisition unit 11 in accordance with the relationship between the specific evaluation and the language evaluation recognized by the specific-evaluation-and-language-evaluation comparing unit 32, and treats the corrected specific evaluation as a final evaluation value.

Moreover, the preference learning unit 51 determines a preference learning method in accordance with the specific evaluation and language evaluation output from the specific-evaluation-and-language-evaluation comparing unit 32 and the language-evaluation feature value determined by the language-evaluation feature-value determination unit 34. Here, the preference learning method performed by the preference learning unit 51 is a method based on the above-described second method.

The preference learning unit 51 performs preference learning by the determined preference learning method in accordance with the final evaluation value and feature values of the subject content item stored in the content-feature-value storage unit 18. The preference learning unit 51 supplies, as preference information, a preference vector created by performing preference learning to the recommendation-and-presentation unit 19.

Figure 10:
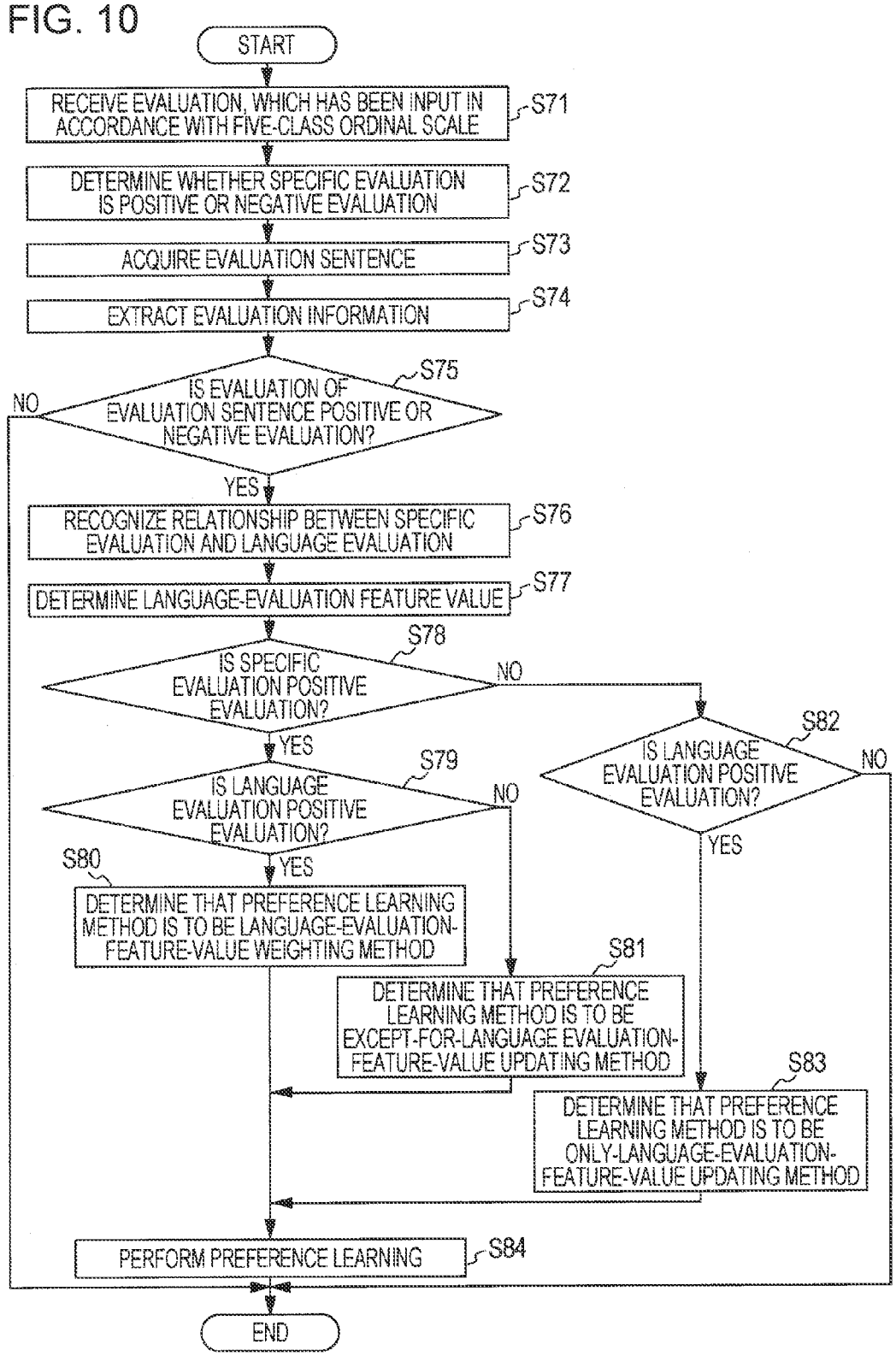
FIG. 10 is a flowchart illustrating learning processing performed by the information processing apparatus shown in FIG. 9.

FIG. 10 is a flowchart illustrating learning processing performed by the information processing apparatus 50 shown in FIG. 9. This learning processing starts when, for example, the user inputs a class of the five-class ordinal scale and an evaluation sentence regarding the subject content item.

Processing in steps S71 to S76 shown in FIG. 10 is similar to processing in steps S11 to S16 shown in FIG. 3. Thus, the description thereof is omitted.

After processing in step S76 is performed, in step S77, the language-evaluation feature-value determination unit 34 determines that the language-evaluation feature value is to be a feature value corresponding to an evaluation attribute, which is a word similar to the evaluation attribute extracted by the language-evaluation information extraction unit 31, from among the evaluation attributes in the attribute-and-feature-value correspondence information stored in the attribute-and-feature-value correspondence storage unit 33.

Then, the language-evaluation feature-value determination unit 34 supplies the language-evaluation feature value to the preference learning unit 51.

In step S78, the preference learning unit 51 determines whether the specific evaluation is a positive evaluation in accordance with the specific evaluation and language evaluation supplied from the specific-evaluation-and-language-evaluation comparing unit 32. If the preference learning unit 51 determines that the specific evaluation is a positive evaluation in step S78, in step S79, the preference learning unit 51 determines whether the language evaluation is a positive evaluation in accordance with the specific evaluation and language evaluation supplied from the specific-evaluation-and-language-evaluation comparing unit 32.

If the preference learning unit 51 determines that the language evaluation is a positive evaluation in step S79, that is, when the specific evaluation and the language evaluation are positive evaluations, the procedure proceeds to step S80. In step S80, the preference learning unit 51 determines that the preference learning method is to be a language-evaluation feature-value weighting method in which a preference vector is updated by weighting the language-evaluation feature value of the subject content item.

The following will describe the language-evaluation feature-value weighting method.

When a preference vector before learning is $m = (m_1, m_2, \ldots, m_M)$ (note that M represents the number of types of feature value), the number of content items in a content group used to create the preference vector is $N_p$, and feature values of a subject content item j are $f_j = (f_{j1}, f_{j2}, \ldots, f_{jM})$, the preference vector is updated in accordance with Eq. (1) given below in the second method.

$$m'_i = (N_p m_i + f_{ji})/(N_p + 1) \qquad \text{Eq. (1)}$$

Here, in Eq. (1), $m'_i$ represents each element of a preference vector m', which is obtained as a result of learning.

Moreover, the number of content items $N_p'$ in the content group used to create the preference vector m' is expressed by Eq. (2) given below.

$$N_p' = N_p + 1 \qquad \text{Eq. (2)}$$

In contrast, in the language-evaluation-feature-value weighting method, a language-evaluation feature value $m_k$ is updated in accordance with Eq. (3) given below, and feature values $m_i$ other than the language-evaluation feature value $m_k$ are updated in accordance with Eq. (1) given above.

$$m'_k = (N_p m_k + \beta f_{jk})/(N_p + \beta) \qquad \text{Eq. (3)}$$

Here, in Eq. (3), a constant β is a value greater than one. According to Eq. (3), a language-evaluation feature value $m'_k$ of the preference vector m' after learning becomes closer to a language-evaluation feature value $f_{jk}$ of the subject content item j. Thus, in the language-evaluation-feature-value weighting method, learning is performed by giving a heavier weight to the language-evaluation feature value of the preference vector. After processing in step S80 is performed, the procedure proceeds to step S84.

In contrast, if the preference learning unit 51 determines that the language evaluation is not a positive evaluation in step S79, that is, when the specific evaluation is a positive evaluation and the language evaluation is a negative evaluation, the procedure proceeds to step S81. In step S81, the preference learning unit 51 determines that the preference learning method is to be an except-for-language-evaluation-feature-value updating method in which feature values of the preference vector other than the language-evaluation feature value of the preference vector are updated in accordance with Eq. (1). In this except-for-language-evaluation-feature-value updating method, feature values $m'_i$ of the preference vector m' other than the language-evaluation feature value $m'_k$ of the preference vector m' become closer to a feature value $f_{ji}$ of the subject content item j. After processing in step S81 is performed, the procedure proceeds to step S84.

Moreover, if the preference learning unit 51 determines that the specific evaluation is not a positive evaluation in step S78, that is, when the specific evaluation is a negative evaluation, the procedure proceeds to step S82. In step S82, the preference learning unit 51 determines whether the language evaluation is a positive evaluation.

If the preference learning unit 51 determines that the language evaluation is a positive evaluation in step S82, that is, when the specific evaluation is a negative evaluation and the language evaluation is a positive evaluation, the procedure proceeds to step S83.

In step S83, the preference learning unit 51 determines that the preference learning method is to be an only-language-evaluation-feature-value updating method in which only the language-evaluation feature value is updated in accordance with Eq. (1). In this only-language-evaluation-feature-value updating method, only the language-evaluation feature value $m'_k$ of the preference vector m' becomes closer to a feature value $f_{jk}$ of the subject content item j. After processing in step S83 is performed, the procedure proceeds to step S84.

In step S84, the preference learning unit 51 performs preference learning by one of the preference learning methods determined in one of steps S80 to S83, and the procedure ends.

In contrast, if the preference learning unit 51 determines that the language evaluation is not a positive evaluation in step S82, that is, when both the specific evaluation and the language evaluation are negative evaluations, the procedure ends.

Here, in a case in which the preference learning unit 51 also learns a negative preference vector, when both the specific evaluation and the language evaluation are negative evaluations, the preference learning unit 51 updates a language-evaluation feature value of a negative preference vector in accordance with an equation similar to Eq. (3) and updates feature values other than the language-evaluation feature value in accordance with an equation similar to Eq. (1). As a result, learning is performed by giving a heavier weight to the language-evaluation feature value of the negative preference vector.

Recommended-content presentation processing performed by the information processing apparatus 50 is similar to the recommended-content presentation processing shown in FIG. 4. Thus, the description thereof is omitted.

As described above, the information processing apparatus 50 determines the preference learning method in accordance with a language-evaluation feature value, a specific evaluation, and a language evaluation, and recommends content items in accordance with preference information created by preference learning performed by the preference learning method. Thus, the information processing apparatus 50 can recommend content items that match the user's preference with higher accuracy than a case in which content items are recommended in accordance with one of the specific evaluation and the language evaluation.

Here, in the above-described description, the evaluation value used in preference learning is the corrected evaluation value of the main evaluation in the information processing apparatuses 30 and 50, the correction being performed in accordance with the relationship between the specific evaluation and the language evaluation. However, the evaluation value used in preference learning may be the evaluation value of the specific evaluation or the evaluation value of the language evaluation as it is.

Moreover, embodiments according to the present invention can also be applied to a recording apparatus that records recommended content items or similar content items as well as an apparatus that presents content-related information items regarding the recommended content items or similar content items.

The above-described series of processing processes can be executed by hardware or software. When the series of processing processes is executed by software, a program constituting the software is installed on a computer. Here, examples of the computer include a computer embedded in dedicated hardware, a general-purpose personal computer that is capable of performing various functions with installed various programs, and the like.

Figure 11:
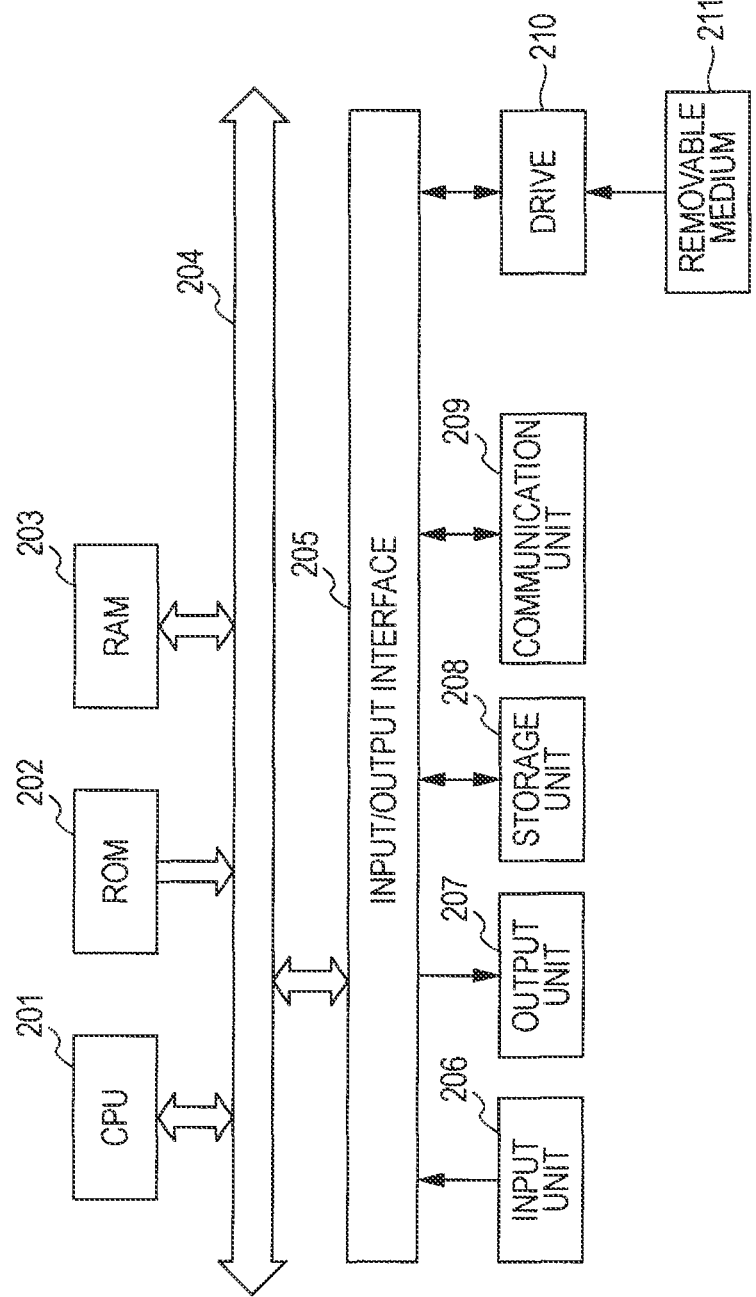
FIG. 11 is a block diagram of an example of the structure of hardware of a computer.

FIG. 11 is a block diagram of an example of the structure of hardware of a computer that executes the above-described series of processing processes by using a program.

In the computer, a central processing unit (CPU) 201, a read-only memory (ROM) 202, and a random access memory (RAM) 203 are connected to each other via a bus 204.

Furthermore, an input/output interface 205 is connected to the bus 204. An input unit 206, an output unit 207, a storage unit 208, a communication unit 209, and a drive 210 are connected to the input/output interface 205.

The input unit 206 includes a keyboard, a mouse, and a microphone. The output unit 207 includes a display and a speaker. The storage unit 208 includes a hard disk and a nonvolatile memory. The communication unit 209 includes a network interface. The drive 210 drives a removable medium 211 such as a magnetic disk, an optical disk, a magneto-optical disk, or a semiconductor memory.

In the computer having the above-described structure, the above-described series of processing processes is performed when, for example, the CPU 201 loads the program stored in the storage unit 208 into the RAM 203 via the input/output interface 205 and the bus 204 and executes the program.

The program executed by the computer (the CPU 201) may be provided by, for example, the removable medium 211, which is a packaged medium or the like, on which the program is recorded. Moreover, the program may be provided via a wired or wireless transmission medium such as a local area network, the Internet, or digital satellite broadcasting.

In the computer, the program can be installed on the storage unit 208 via the input/output interface 205 by inserting the removable medium 211 in the drive 210. Moreover, the program can be received by the communication unit 209 via a wired or wireless transmission medium and can be installed on the storage unit 208. Alternatively, the program can be preinstalled on the ROM 202 or the storage unit 208.

In the specification, the steps described in the program recorded on a program recording medium may be, as a matter of course, performed in accordance with the time sequence following the described order. The steps does not have to be performed in accordance with the time sequence following the described order and may be performed in parallel or individually.

The present application contains subject matter related to that disclosed in Japanese Priority Patent Application JP 2009-187046 filed in the Japan Patent Office on Aug. 12, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a circuitry configured to:
receive:
voice data of a user, wherein the voice data is related to an item; and
a rating for the item based on an input other than the voice data, wherein the rating corresponds to a first numerical value selected from a first range of numerical values;
convert the voice data into language text data;
analyze the language text data to determine a second numerical value selected from a second range of numerical values;
assign a weight to one among the rating or the analyzed language text data based on the other of the rating or the analyzed language text data;
extract at least one recommendation item based on the assigned weight, the analyzed language text data and the rating; and
change the first numerical value to make the first numerical value closer to a middle numerical value of the first range of numerical values, based on one of the first numerical value is less than a first threshold and the second numerical value is greater than a second threshold, or the first numerical value is greater than the first threshold and the second numerical value is less than the second threshold.

2. The information processing apparatus according to claim 1, wherein the circuitry is further configured to:
receive the rating for the item selected by a client terminal of the user.

3. The information processing apparatus according to claim 1, wherein the circuitry is further configured to determine which one of the rating or the language text data is to be a main preference of the user to learn preference information.

4. The information processing apparatus according to claim 1,
wherein the circuitry is further configured to:
determine a content feature value for each of a plurality of recommendation-candidate items;
calculate a degree of similarity or a distance between the item and each of the plurality of recommendation-candidate items, wherein the calculation is based on the content feature value; and
recommend the at least one recommendation item among the plurality of recommendation-candidate items based on the degree of similarity or the distance between the item and each of the plurality of recommendation-candidate items.

5. The information processing apparatus according to claim 1, wherein the circuitry is further configured to:
learn preference information based on at least one of the rating, the language text data or a first feature value of the item that corresponds to a language evaluation attribute,
wherein the language evaluation attribute is acquired from the language text data, and wherein the learned preference information is determined based on the first feature value that corresponds to the language evaluation attribute.

6. The information processing apparatus according to claim 5, wherein the preference information is learned based on a weighted feature value of the at least one recommendation item.

7. The information processing apparatus according to claim 5, wherein the preference information is learned based on a second feature value of the at least one recommendation item.

8. The information processing apparatus according to claim 1, wherein the circuitry is further configured to determine the analyzed language text data as a main preference of the user, based on whether a first error between the analyzed language text data and a first predicted value of the analyzed language text data for a plurality of recommendation-candidate items from which the at least one recommendation item is extracted is less than a second error between the rating and a second predicted value of the rating for the plurality of recommendation-candidate items.

9. A method for processing information, comprising:
in an information processing apparatus:
    receiving:
        voice data from a user, wherein the voice data is related to an item; and
        a rating for the item based on an input other than the voice data, wherein the rating corresponds to a first numerical value selected from a first range of numerical values;
    converting the voice data into language text data;
    analyzing the language text data to determine a second numerical value selected from a second range of numerical values;
    assigning a weight to one among the rating or the analyzed language text data based on the other of the rating or the analyzed language text data;
    extracting at least one recommendation item based on the assigned weight, the analyzed language text data and the rating; and
    changing the first numerical value to make the first numerical value closer to a middle numerical value of the first range of numerical values, based on one of the first numerical value is less than a first threshold and the second numerical value is greater than a second threshold, or the first numerical value is greater than the first threshold and the second numerical value is less than the second threshold.

10. A non-transitory computer-readable storage medium having stored thereon computer-executable instructions that, when executed by a processor, cause a computer to perform operations, the operations comprising:
    receiving:
        voice data from a user, wherein the voice data is related to an item; and
        a rating for the item based on an input other than the voice data, wherein the rating corresponds to a first numerical value selected from a first range of numerical values;
    converting the voice data into language text data;
    analyzing the language text data to determine a second numerical value selected from a second range of numerical values;
    assigning a weight to one among the rating or the analyzed language text data based on the other of the rating or the analyzed language text data;
    extracting at least one recommendation item based on the assigned weight, the analyzed language text data and the rating; and
    changing the first numerical value to make the first numerical value closer to a middle numerical value of the first range of numerical values, based on one of the first numerical value is less than a first threshold and the second numerical value is greater than a second threshold, or the first numerical value is greater than the first threshold and the second numerical value is less than the second threshold.

* * * * *